March 3, 1936. H. A. BENDFELT 2,032,971
APPARATUS FOR INJECTING IMMISCIBLE MATERIAL INTO ICE CREAM AND THE LIKE
Original Filed Aug. 6, 1932 3 Sheets-Sheet 2
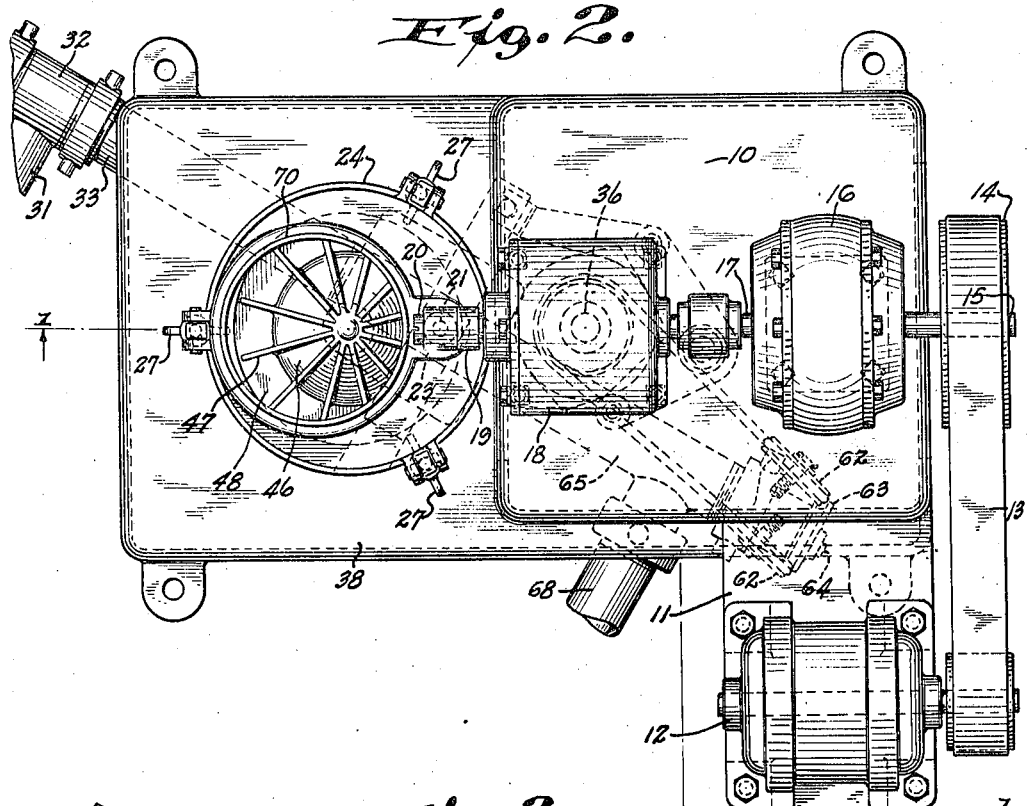
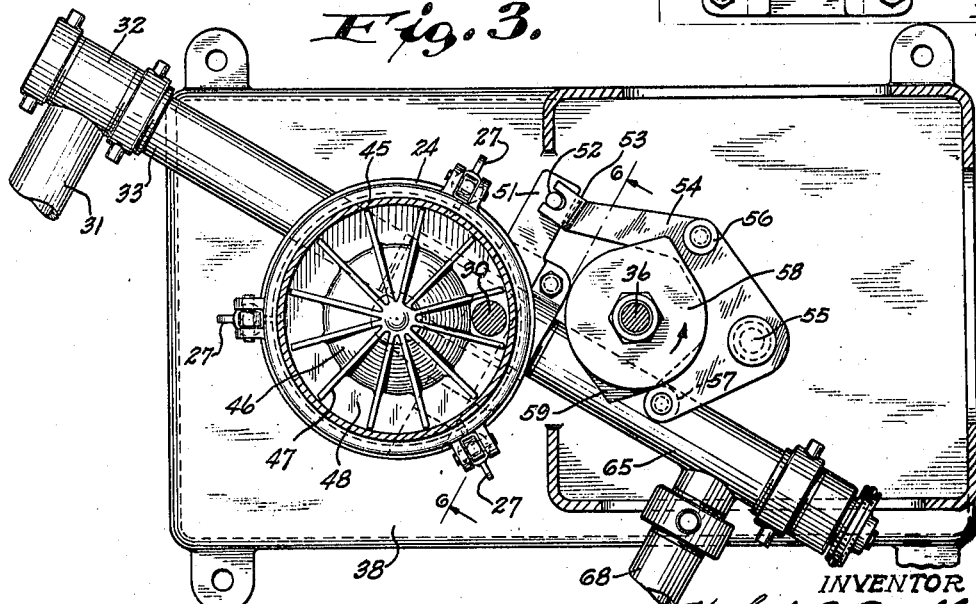
INVENTOR
Herbert A. Bendfelt
BY
ATTORNEYS March 3, 1936.   H. A. BENDFELT   2,032,971
APPARATUS FOR INJECTING IMMISCIBLE MATERIAL INTO ICE CREAM AND THE LIKE
Original Filed Aug. 6, 1932   3 Sheets-Sheet 3
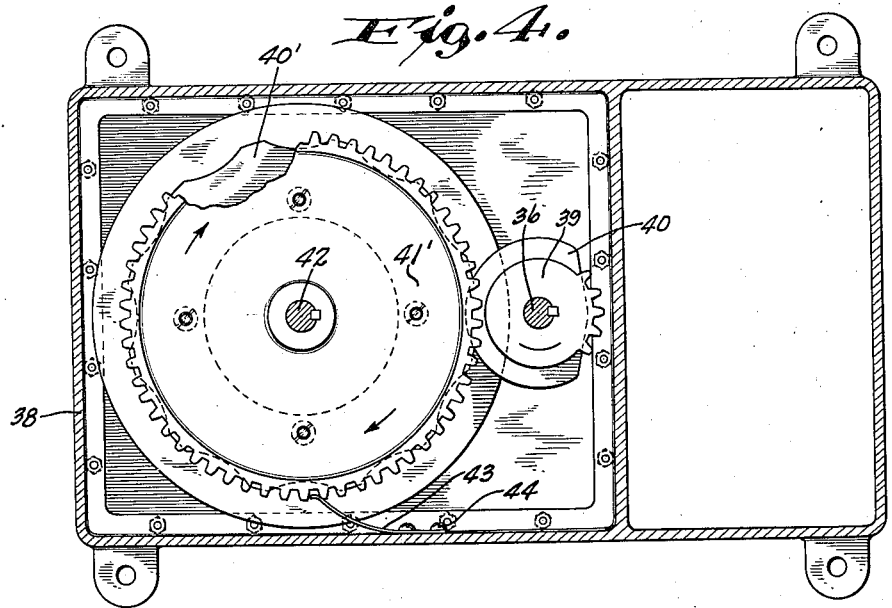
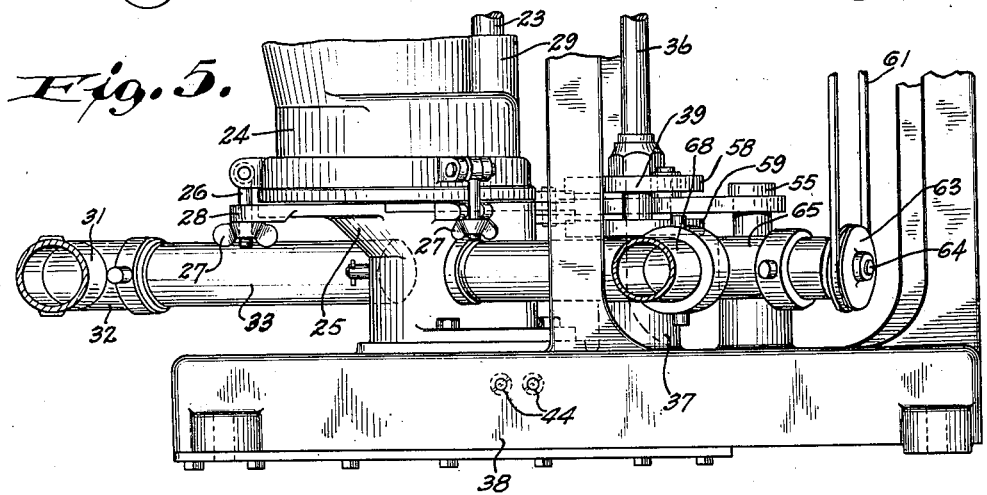
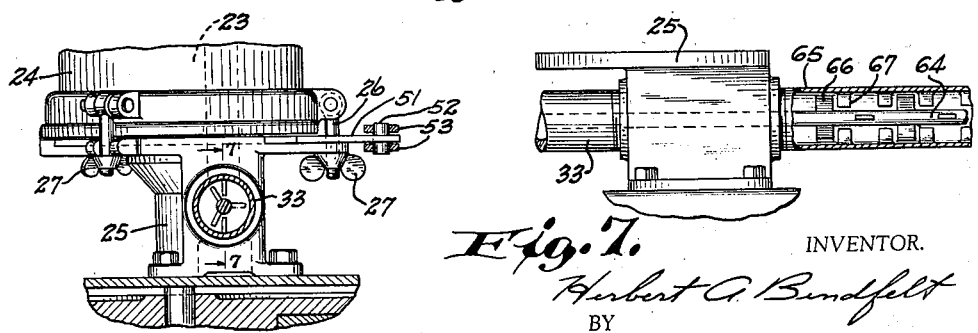
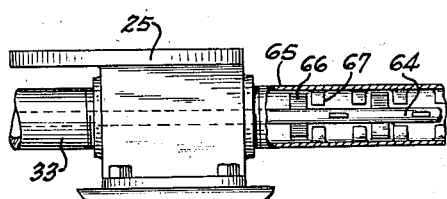
INVENTOR.
Herbert A. Bendfelt
BY
Morsell Kieber & Morsell
ATTORNEYS.

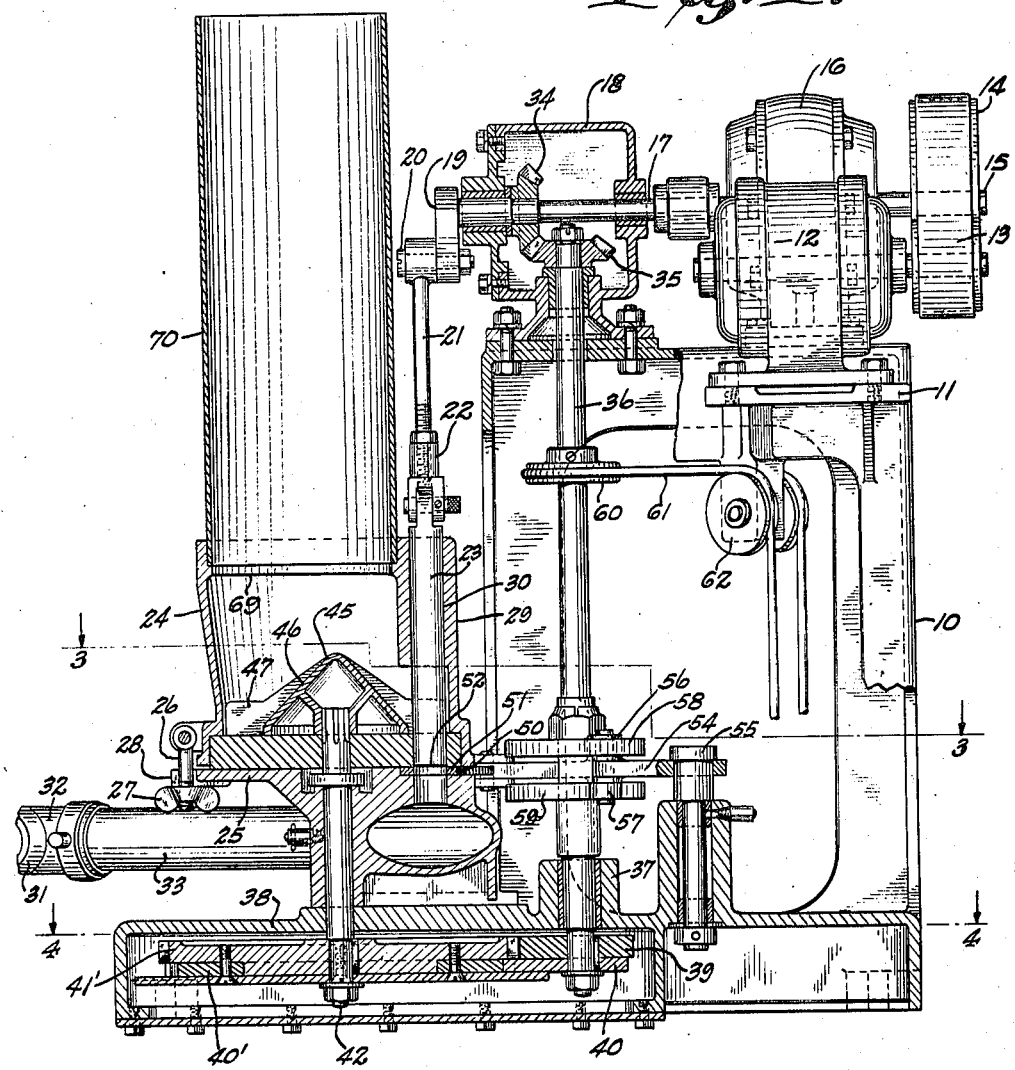

Patented Mar. 3, 1936

2,032,971

UNITED STATES PATENT OFFICE 2,032,971

APPARATUS FOR INJECTING IMMISCIBLE MATERIAL INTO ICE CREAM AND THE LIKE

Herbert A. Bendfelt, Milwaukee, Wis., assignor to Vogt Processes, Incorporated, Louisville, Ky., a corporation of Delaware Original application August 6, 1932, Serial No. 627,799. Divided and this application June 19, 1933, Serial No. 676,525

30 Claims. (Cl. 99—2)

This invention relates in general to improvements in the art of manufacturing ice cream and more specifically to an improved apparatus for delivering flavoring materials to the ice cream while the latter is under pressure. Such materials might be whole or crushed fruits, nuts or the like which are added to give the desired flavor, taste or texture, and may be made up in whole or in part of solids. All such added materials are hereinafter referred to as "edible flavoring material". The present application is a division of application Ser. No. 627,799.

For many years ice cream has been manufactured in so-called "batch" freezers. In this method of procedure the freezer is filled with a predetermined quantity of ice cream mix, and the latter is whipped, frozen, and finally discharged in the form of partially frozen ice cream sufficiently liquid to readily flow from the freezer. Another batch of mix is then delivered to the freezer and the procedure repeated. Inasmuch as the ice cream is not under pressure in the batch method it has been relatively simple to add materials such as fruit and nuts and mix them with the partially congealed mass either in the freezer or at a point near the discharge opening and before the partially frozen product is taken to the hardening room for further freezing and hardening.

In recent years, however, a new continuous freezing process of the type disclosed in the Vogt Patents 1,783,864 and 1,783,865 has come into use in the larger plants. With this new method of manufacture the ice cream mix is continuously supplied at one end, is conveyed under pressure through the freezer, and is continuously conveyed under pressure through a conduit at the other end and may be discharged directly into containers for the ice cream, and in which containers the final freezing or hardening may take place. To add fruit and nuts to the mix before or as the mix is admitted to the freezing chamber results in the rotary scrapers within the freezer causing undesirable mutilation of the fruit and nuts and the latter in time may cause clogging of the apparatus. To attempt to add these materials to the discharge end in the manner employed with the batch freezer method is not possible as the pressure to which the congealed mass is subjected causes it to "back up" into any ordinary opening through which it might be attempted to add the fruit and nuts.

It is therefore, one of the objects of this invention to provide an improved apparatus for manufacturing ice cream by means of which immiscible material may be effectively injected into the congealed mass as the latter is being conveyed under pressure without interrupting the continuous process.

A further object of the invention is to provide an improved apparatus for the purpose described in which the possibility of the fruit, nuts or the like becoming crushed is minimized.

A more specific object of the invention is to provide an apparatus for manufacturing ice cream having means for feeding the flavoring or other material to the ice cream while the latter is being conveyed under pressure wherein novel forcing or feeding mechanism is utilized for preventing "backing up" of the ice cream during the injecting operation, and wherein the timing of said valve mechanism is correlated with the timing of the feeding and injecting means.

With the above and other objects in view the invention consists of the improved art of manufacturing ice cream and all its parts and combinations as set forth in the claims, and all equivalents thereof.

In the accompanying drawings illustrating one complete embodiment of the preferred form of the invention in which the same reference numerals designate the same parts in all of the views:

Fig. 1 is a front elevational view of the improved device part being shown in vertical section and part being broken away;

Fig. 2 is a plan view thereof;

Fig. 3 is a sectional view taken on line 3—3 of Fig. 1;

Fig. 4 is a sectional view taken on line 4—4 of Fig. 1;

Fig. 5 is a fragmentary front elevational view showing the lower portion of the apparatus;

Fig. 6 is a sectional view taken on line 6—6 of Fig. 3; and

Fig. 7 is a detail view showing a portion of the ice cream conduit, part being broken away.

Referring more particularly to the drawings, the numeral 10 designates a suitable platform having a bracket extension 11 for supporting a driving motor 12. The motor is connected by a suitable belt transmission 13 with a driving pulley 14 rigidly carried on one end of a shaft 15. Said shaft is journaled in a housing 16 containing reduction gearing of any suitable type. From the other end of said housing a shaft 17 extends and said shaft is journaled through a housing 18. The extreme inner end of the shaft 17 projects through the housing and is provided with a crank arm 19 which is connected by means of a pin 20 to the upper end of an arm 21. The lower end of the arm 21 is connected through a suitable adjustment 22 with a piston 23.

A cylindrical receptacle 24 for the fruit, nuts or other edible material to be added to the partially frozen ice cream is removably mounted on a frame portion 25 by means of pivoted bolts 26 and wing nuts 27 engageable with lugs 28 of the frame portion 25. The bottom wall of the receptacle may be formed by a plate 24' over which a flange of the lower end of the receptacle telescopes. The receptacle 24 above the bottom thereof is provided with an enlarged wall portion 29 having a vertical bore or guideway 30 therein for guiding the piston 23 serves to deliver the material from the receptacle to the conduit 33.

Ice cream from a standard type of continuous freezer is discharged continuously under pressure, which may be of about thirty pounds, through a pipe 31. Said pipe is connected by a suitable coupling member 32 with a pipe section 33 extending obliquely through the frame portion 25.

Within the housing 18 the shaft 17 is provided with a bevel gear 34 which engages a bevel gear 35 mounted on a vertical shaft 36. Said vertical shaft has its lower end journaled in a bearing 37 of a gear housing 38 and within the housing the lower end of the shaft 36 has keyed thereto a mutilated gear 39 and below the latter a segmental disc 40. The mutilated gear is engageable with a gear 41' keyed to a shaft 42 and the segmental disc is engageable with a notched disc 40' also keyed to shaft 42 and below the gear 41 resulting in a mechanical construction similar to a Swiss movement. A spring clip 43, has one end secured to the inner wall of the gear housing 38 as at 44 and has its other end inwardly curved and engageable with the teeth of the gear 41 to prevent slippage of said gear.

The shaft 42 extends vertically upwardly through the frame portion 25 and has removably mounted thereon a rotor 45, positioned on the bottom of the cylindrical receptacle 24.

The rotor 45 comprises a central conical portion 46 and a plurality of radially extending partitions 47 which project beyond the conical part to provide an annular series of compartments 48.

The frame portion 25 and the superposed plate or receptacle bottom 24' are formed with a duct 49 extending from the receptacle 24 to the ice cream conduit 33. The duct is in alignment with the piston or plunger 23 and the upper end is positioned to register with the successive compartments 48 of the rotor 45 as the latter rotates.

Between the upper face of the frame part 25 and the under face of the plate 24' is formed an elongated recess 50 which intersects the duct 49 and within said recess a slide valve 51 is movable. The said valve is formed with a circular opening 52 therein of substantially the same size as the duct 49 which is adapted to be brought into and out of registration with said duct upon movement of the valve.

Referring more particularly to Fig. 3, the outer end of the valve member 51 is provided with a pin 52 which is engaged by the forked end 53 of a lever arm 54. Said arm is pivoted as at 55 and is provided with an upwardly extending cam follower 56 and with a depending cam follower 57.

The shaft 36 has keyed thereto a pair of cams 58 and 59. The cam member 58 is engageable with the follower 56 to cause opening of the valve and the cam 59 is engageable with the follower 57 to cause closing of the valve. One of the cams may be provided with a plurality of keyways so that the relative positions of the two cams may be changed to adjust the interval of time between the opening and closing of the valve.

The shaft 36 has rigidly mounted thereon a pulley 60 and an endless belt 61 extending around said pulley passes over idler pulleys 62 to transmit power to a pulley 63 mounted rigidly on the end of a shaft 64. The shaft 64 extends into an extension 65 of the ice cream conduit 33 and carries paddles 66 which are staggered with respect to projections 67 of the ice cream conduit. These paddles effect an intermingling of the fruit and/or nuts with the ice cream prior to the discharge of the mixture through the angularly extending pipe section 68. The latter may lead to a point of discharge for the direct filling of ice cream containers.

The inner periphery of the container 24 is formed near the top with an annular ledge 69 for supporting a hopper 70.

In operation if it is desired to inject fresh fruit such as strawberries or raspberries into the ice cream, the hopper 70 is filled with this fruit. This motor 12 is then set in operation and through the belt 13, pulley 14, and shafts 15 and 17 motion is transmitted to the crank arm 19. The latter causes reciprocation of the piston 23 from its lowermost position shown in Fig. 1 to a raised position above the rotor 45. At the same time through the bevel gears 34 and 35, the shaft 36 is driven. Rotation of this shaft will, through the mutilated gear 39, cause intermittent rotation of the gear 41, shaft 42 and rotor 45. The drive for the piston is so timed with respect to the drive for the rotor that each time the rotor advances a partial revolution, one of the compartments 48 will be positioned directly below the piston 23 and will remain in said position until the piston has been lowered and completely raised. Then the mutilated gear will cause another partial rotation of the rotor to present the next successive compartment of the rotor to the action of the piston. The fruit in the hopper 70 will be directed by the conical portion 46 of the rotor downwardly toward the compartments 48 and will be distributed evenly therein and be admitted in measured charges into the upper end portion of the duct which serves as a measuring chamber. The volume of said charge will depend upon the thickness of the plate 24' between the slide valve and the upper end of the duct 49.

At a proper time during the downward stroke of the piston the cam 58 will engage the follower 56 to cause opening of the slide valve 51 and permit the plunger during the final portion of its downward movement to force the charge along the lower part of the duct 49 leading into the ice cream conduit 33. The piston reciprocating in the upper part of the duct which serves as a cylinder will therefore carry the charge of fruit from the compartment of the rotor under pressure into the duct 49. During the downward movement of the piston, in view of the fact that it closely fits the duct and exerts a pressure at least equal to the pressure on the ice cream in the conduit 33, there will be no danger of the ice cream backing up into the receptacle, and as soon as the piston starts its upward stroke the slide valve will be automatically closed by the action of the cam 59 against the follower 57. When the valve is closed the ice cream is, of course, effectively prevented from backing up, and in view of the fact that the duct 49 is always in operation filled with fruit, the ice cream cannot even enter said duct.

During the next downward movement of the piston the valve will begin to open after the piston enters the upper end of the duct and another charge of fruit from another compartment of the rotor will be forced into the duct 49. Inasmuch as this second charge must displace the first charge therein, the first charge of fruit will be delivered under pressure to the ice cream as the ice cream is being conveyed. Thus there will be regular injections of the fruit to the ice cream stream as the latter travels. To further insure proper intermingling of the two materials the mixing paddles 66 have been provided which act to stir the fruit into the congealed mass, without interrupting the travel of the latter.

In as much as it is essential in order to prevent jamming, that the compartments align perfectly with the piston, it has been necessary to provide mechanism for insuring perfect alignment and for preventing slippage in the drive for the rotor. By referring to Fig. 4 it will be noted that each time the teeth of the mutilated gear 39 engage the gear 41; that a mutilated section of the disc 40 is presented toward the notched disc 40' to prevent rotation of the latter. Thus movement of the gear 41' is permitted to impart a partial rotation to the rotor. As soon as this movement has been completed, however, the segmental disc 40 will engage one of the peripheral recesses of the notched disc 40' as shown in Fig. 4 to positively lock the parts against movement. In addition, in order to prevent any slippage or retrograde movement during the engagement of the teeth of the mutilated gear with the gear 41, the spring catch 43 has been provided which rides over the teeth of the gear 41' and frictionally engages in the spaces between said teeth to prevent free rotation.

From the above, it may be seen that a relatively simple form of mechanism has been provided for positively delivering fruit or the like to ice cream which is being conveyed under pressure without permitting backing up of the ice cream during the delivering operation. It will further be seen that the fruit will be so delivered to the ice cream stream as to minimize the danger of crushing and that the continuous delivery process for the ice cream is in no way interrupted.

In the claims it is to be understood that the term "immiscible material" contemplates any material such as fruit or nuts which may be added to the ice cream and which cannot be added in liquid form to the original materials.

Although only one form of the invention has been shown and described, it is obvious that various modifications may be made without departing from the spirit of the invention and that other adaptations are contemplated as may come within the scope of the claims.

I claim:

1. In combination, means forming a conduit through which ice cream is conveyed under pressure, said conduit having a lateral duct communicating therewith between its inlet and outlet, a reciprocating piston for injecting immiscible material into said ice cream through said duct transversely of the direction of flow of said ice cream, and a valve in said duct movable in timed relationship with said piston.

2. In combination, means forming a conduit through which ice cream is conveyed under pressure, said conduit having a lateral duct communicating therewith between its inlet and outlet, a reciprocating piston for injecting immiscible material into said conduit through said duct transversely of the direction of flow of said ice cream, and a slide valve in said duct movable in timed relationship with said piston to permit said injection.

3. In combination, means forming a conduit through which ice cream is conveyed under pressure, said conduit having a lateral duct communicating therewith between its inlet and outlet, a reciprocating piston for injecting immiscible material into said conduit through said duct transversely of the direction of flow of said ice cream, means for intermittently feeding charges of immiscible material to said piston and a valve in said duct movable in timed relationship with the piston.

4. In combination, means forming a conduit through which ice cream is conveyed under pressure, said conduit having a duct communicating therewith, a reciprocating piston for injecting immiscible material into said conduit through said duct, rotary means for intermittently feeding charges of immiscible material to said piston, and a valve in said duct movable in timed relationship with the piston and said rotary means.

5. In combination, means forming a conduit through which ice cream is conveyed under pressure, said conduit having a duct communicating therewith, a reciprocating piston for injecting immiscible material into said conduit through said duct, a rotor having radial compartments successively positionable in cooperative relationship with said piston and duct, means for feeding immiscible material to the compartments of said rotor, a valve in said duct, and interrelated driving mechanism for said piston, rotor and valve.

6. In combination, means forming a conduit through which ice cream is conveyed under pressure, said conduit having a duct communicating therewith, a reciprocating piston for injecting immiscible material into said conduit through said duct, a rotor having radial compartments successively positionable in line with said piston and duct, means for feeding immiscible material to the compartments of said rotor, a valve in said duct, cam mechanism for opening and closing said valve, and interrelated driving mechanism for said piston, rotor and valve operating cam mechanism.

7. In combination, means forming a conduit for ice cream, said conduit having a duct communicating therewith, a reciprocating piston, a compartmental rotor, means for driving said rotor to present successive compartments to the action of said piston following each reciprocation of the latter, means for feeding material to said rotor, and means for insuring alignment of the compartments of said rotor with said piston.

8. In combination, means forming a conduit for ice cream, said conduit having a duct communicating therewith, a reciprocating piston, a compartmental rotor, means for driving said rotor to present successive compartments to the action of said piston following each reciprocation of the latter, means for feeding material to said rotor, and means including mechanism for temporarily locking the rotor in each position of movement to insure alignment of the compartments of said rotor with said piston.

9. In combination, means forming a conduit for ice cream, said conduit having a duct communicating therewith, a reciprocating piston, a compartmental rotor having a conical central portion for directing material toward the compartments thereof, means for driving said rotor to present successive compartments to the action of said piston following each reciprocation of the latter, and means for feeding material to said rotor.

10. In combination means forming a conduit for ice cream, said conduit having a duct communicating therewith, a reciprocating piston, a compartmental rotor having a conical central portion for directing material toward the compartments thereof, means for driving said rotor to present successive compartments to the action of said piston on each reciprocation of the latter, means for feeding material to said rotor, and means for insuring alignment of the compartments of said rotor with said piston.

11. In combination, means forming a conduit through which ice cream is conveyed under pressure, said conduit having a lateral duct communicating therewith between its inlet and outlet, a reciprocating piston for injecting immiscible material in separate and successive charges into said ice cream through said duct transversely of the direction of flow of said ice cream, and means in said duct for alternately preventing and permitting flow through said lateral duct.

12. In combination, means forming a conduit through which ice cream is conveyed under pressure, a receptacle for immiscible edible material, a reciprocating piston for injecting said material into said conduit, and rotary means for feeding successive charges of said material to said piston.

13. In combination, means forming a conduit through which ice cream is conveyed under pressure, said conduit having a duct communicating therewith, a reciprocating piston for injecting immiscible material into said conduit through said duct, a rotor having an annular series of compartments successively positionable in cooperative relationship with said piston and duct, and means for feeding immiscible material to the compartments of said rotor.

14. In combination, means forming a conduit for ice cream, said conduit having a duct communicating therewith, a rotor having an annular series of compartments and having a conical central portion for directing material toward the compartments, said compartments registering successively with said duct during the rotation of said rotor, and means for forcing material from said duct into said conduit.

15. In combination, means forming a conduit through which ice cream is delivered under pressure, a receptacle for edible immiscible material, a duct connecting said receptacle and said conduit at a point intermediate of the ends of the latter, a piston mounted to reciprocate into and out of the end of the duct communicating with the receptacle, and a slide valve movable transversely of said duct for opening and closing the duct beyond the inward limiting position of said piston.

16. In combination a conduit for delivering a stream of ice cream from a continuous ice cream freezer and under a pressure substantially above that of the atmosphere, a receptacle for edible solids, a chamber for a measured charge of said solids, a plunger mounted to reciprocate in said chamber, said chamber being adapted to receive solids from said receptacle with the latter in open communication with said receptacle and out of communication with said conduit, means for opening communication between said chamber and said stream, and means for reciprocating said plunger to discharge said solids from said chamber into said conduit, whereby flow of ice cream from said stream into said receptacle or release of pressure from said stream is prevented.

17. In combination a conduit for delivering ice cream from a continuous ice cream freezer and under a pressure substantially above that of the atmosphere, a receptacle for edible solids, a vertically disposed cylinder below said receptacle, and adapted to be filled by flow of said material from said receptacle while said cylinder is out of communication with said conduit, and means for closing communication between said cylinder and said receptacle, opening communication between said cylinder and said conduit intermediate of the ends of the latter, and discharging the contents of said cylinder into said conduit.

18. In combination a conduit for delivering ice cream from a continuous ice cream freezer and under a pressure substantially above that of the atmosphere, a receptacle for edible solids, a chamber disposed beneath said receptacle and adapted to receive a predetermined volume of said material from said receptacle, means for preventing flow of ice cream into said chamber while the latter is in communication with said receptacle, a plunger for forcing material from said chamber into said conduit intermediate of the ends of the latter, and means for establishing communication between said chamber and said conduit and receptacle alternately and permitting the filling of said chamber by gravity from said receptacle and acting to force material from said chamber into said conduit against the pressure of the ice cream in the latter.

19. In combination, confining means for transporting ice cream under pressure, and pressure means for injecting an edible material into the interior of said ice cream during transportation of and while the latter is confined at approximately the pressure thereof so that the pressure on said ice cream will not cause it to be diverted in its movement during injection of said material.

20. In combination, means for forming a confining conduit for conveying ice cream while under pressure, and means for injecting immiscible material into said conduit while the ice cream is being conveyed therethrough and while said ice cream is confined.

21. In combination, confining means for transporting ice cream along a definite path under pressure, and positve displacement means for injecting immiscible material into said path while the ice cream is being conveyed therealong and while it is confined.

22. In combination, a passage for continuously transporting a stream of partially frozen ice cream under pressure, a receptacle adapted to contain edible solids, a transfer mechanism for transferring successive charges of solids from said receptacle to discharging position with respect to said passage, means for forcing said charges from said latter position into said passage, and means operable to prevent escape of ice cream from said passage towards said receptacle during the interval between successive forcing operations, and to permit unobstructed movement of said solids into said passage during forcing periods.

23. In combination, a conduit for continuously transporting a stream of partially frozen ice cream under pressure, a receptacle adapted to contain edible solids, a transfer mechanism having a compartment movable cyclically between a filling position with respect to said receptacle and a discharging position with respect to said conduit, means for injecting solids from said compartment in said latter position into said conduit along a predetermined path, and a member movable transversely across said path for preventing escape of ice cream from said conduit towards said receptacle during the interval between successive injection periods, said member being movable to permit the unobstructed movement of said solids into said conduit during injection periods.

24. In combination, a confining conduit for continuously transporting a stream of partially frozen ice cream under pressure, a receptacle adapted to contain edible solids, a transfer mechanism having a compartment movable cyclically between a filling position with respect to said receptacle and a discharging position with respect to said conduit, means for injecting solids from said compartment in said latter position into said conduit, and means operable to prevent release of pressure of said ice cream into said compartment during the interval between successive injection operations and to permit unobstructed movement of said solids into said conduit during injection periods.

25. In combination, a passage for conveying partially frozen ice cream under pressure, a receptacle adapted to receive edible solids, a rotor having a plurality of radially extending thin plates forming a series of adjoining compartments, said compartments being adapted to be moved successively from filling position with respect to said receptacle into discharging position, and means for transferring the charges of edible solids from said compartments when in said latter position into said passage and into the interior of the mass of ice cream therein.

26. In combination, a confining conduit for continuously conveying partially frozen ice cream under pressure, a compartment for receiving a charge of edible solids, means for moving said compartment horizontally from filling position where it is out of communication with said conduit into a discharging position in communication with said conduit, and means operable when said compartment is in the latter position for injecting the solids therefrom into said conduit.

27. In combination, a conduit for continuously conveying a stream of partially frozen ice cream under pressure, a receptacle adapted to contain edible solids, a transfer mechanism having a series of adjoining compartments movable successively horizontally from a position in which said compartments are gravitationally filled from said receptacle to a discharging position in respect to said conduit, and means for injecting solids from said compartments successively into said conduit when said compartments reach said latter position.

28. In combination, a confining conduit for conveying a stream of partially frozen ice cream under pressure, means for injecting edible solids into said conduit while the ice cream is being conveyed therethrough, and separate means in said confined stream for effecting substantially uniform distribution of said edible solids through said stream.

29. In combination, a confining conduit for continuously transporting a stream of partially frozen ice cream under pressure, a duct communicating with said conduit, means for forcibly injecting separate successive batches of edible solids through said duct and directly into the interior of said stream of ice cream while the latter is confined and being conveyed, and valve means between the inlet and discharge ends of said duct and actuated in synchronism with said injecting means for preventing release of pressure from said stream into said duct during the intervals between successive injection operations of said injecting means.

30. In combination, a confining conduit for continuously transporting a stream of partially frozen ice cream under pressure, a duct communicating with said conduit, means for forcibly injecting separate successive batches of edible solids through said duct and directly into the interior of said stream of ice cream while the latter is confined and being conveyed, and valve means positively actuated in synchronism with said injecting means for preventing release of pressure of said stream into said duct during the intervals between successive injection operations of said injecting means.

HERBERT A. BENDFELT.